US007817090B2

(12) United States Patent
Torimoto et al.

(10) Patent No.: US 7,817,090 B2
(45) Date of Patent: Oct. 19, 2010

(54) APPARATUS FOR TRANSMITTING POSITIONING SIGNAL, POSITIONING SYSTEM INCLUDING THE APPARATUS, AND SYSTEM FOR TRANSMITTING POSITIONING SIGNAL

(75) Inventors: Hideyuki Torimoto, Tokyo (JP); Ivan Petrovski, Tokyo (JP)

(73) Assignees: Funai Electric Co., Ltd., Daito-shi, Osaka (JP); GNSS Technologies Inc., Tokyo (JP)

(*) Notice: Subject to any disclaimer, the term of this patent is extended or adjusted under 35 U.S.C. 154(b) by 0 days.

(21) Appl. No.: 11/480,795

(22) Filed: Jul. 3, 2006

(65) Prior Publication Data

US 2007/0010212 A1      Jan. 11, 2007

(30) Foreign Application Priority Data

Jul. 5, 2005     (JP)     ............................. 2005-196322

(51) Int. Cl.
*G01S 1/00* (2006.01)
(52) U.S. Cl. .................................................... 342/385
(58) Field of Classification Search ......... 342/385–386, 342/357.01–357.17; 375/132–134
See application file for complete search history.

(56) References Cited

U.S. PATENT DOCUMENTS

| | | | |
|---|---|---|---|
| 5,017,926 A | | 5/1991 | Ames et al. |
| 5,440,491 A | * | 8/1995 | Kawano et al. ............. 701/200 |
| 6,157,896 A | * | 12/2000 | Castles et al. ................. 702/95 |
| 6,882,314 B2 | * | 4/2005 | Zimmerman et al. ........ 342/464 |
| 2004/0136468 A1 | * | 7/2004 | Suzuki ........................ 375/295 |

FOREIGN PATENT DOCUMENTS

WO     WO-03/027703 A2     4/2003

OTHER PUBLICATIONS

Paul Hendricks, Sawtooth Generator Spans a 70-dB Range, Feb. 16, 2005.*
European Search Report for European Application No. 06013647 dated Feb. 23, 2007 (11 pages).
USCG Navigation Center: "GPS SPS Signal Specification 2nd Edition—section 1.0" [Online] Jun. 2, 1995; XP007901620; retrieved from URL:http//ftp.iasi.roedu.net/mirrors/ftp.tapr.org/gps/gpssps1.pdf; [Retrieved on Jan. 31, 2007] fig. 1-1 and p. 6, par. 2; fig. 1-2 and p. 7 (8 pages).
USCG Navigation Center: "GPS User Equipment Introduction—chapter 1" [Online] Sep. 1996; XP007901622; retrieved from URL:http://www.navcen.uscg.gov/pubs/gps/gpsuser/gpsuser.pdf [Retrieved on Dec. 31, 2007] p. 1-4 and fig. 1-4 (24 pages).
Hein G W et al.: "Status of Galileo frequency and signal design" Proceedings of the Institute of Navigation (ION) GPS, Sep. 24, 2002; XP00227330; pp. 266-277.

* cited by examiner

*Primary Examiner*—Thomas H Tarcza
*Assistant Examiner*—Nga X Nguyen
(74) *Attorney, Agent, or Firm*—Osha Liang LLP

(57) ABSTRACT

An apparatus that can transmit a signal enabling higher accuracy of calculating positional information is provided. A transmitting apparatus transmitting a positioning signal includes an oven controller crystal oscillator (OCXO) having a thermostatic oven that keeps the temperature of a quartz resonator constant and oscillates such that variation in output frequency caused by the ambient temperature change is minimized, a voltage controlled oscillator (VCO) outputting a signal modulated in accordance with the signal from OCXO, multipliers, a code generator outputting code patterns for respectively identifying each of artificial satellites on which the transmitting apparatus is mounted to multiplier, a memory storing a navigation message, a transmitting portion, and an antenna.

19 Claims, 16 Drawing Sheets

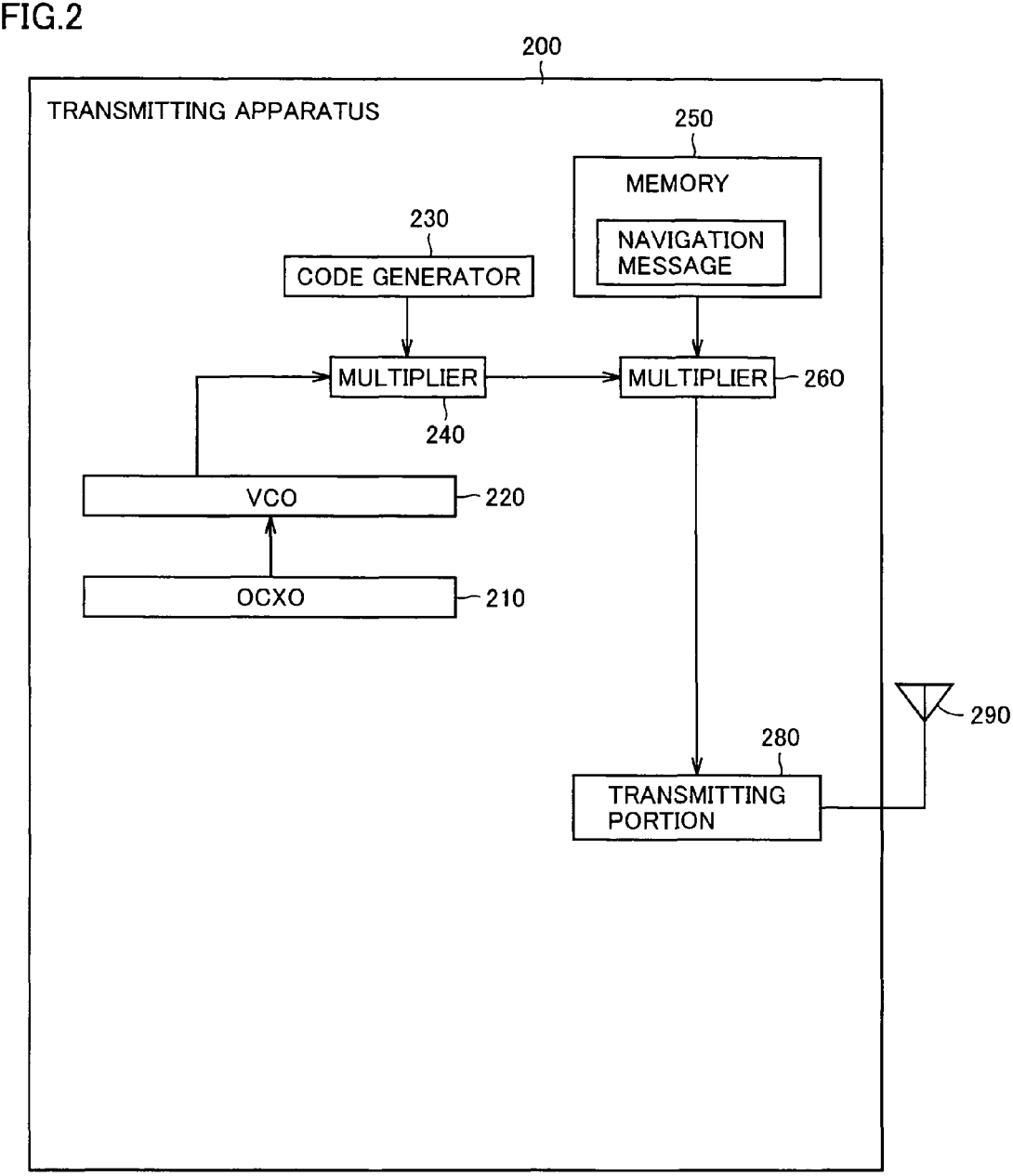

APPARATUS FOR TRANSMITTING POSITIONING SIGNAL, POSITIONING SYSTEM INCLUDING THE APPARATUS, AND SYSTEM FOR TRANSMITTING POSITIONING SIGNAL

BACKGROUND OF THE INVENTION

1. Field of the Invention

The present invention relates to a technique for transmitting signals and, more specifically, to an apparatus for transmitting a positioning signal, a positioning system including the apparatus, and to a system for transmitting a positioning signal.

2. Description of the Background Art

A satellite navigation system such as GPS (Global Positioning System), GLONASS (Global Navigation Satellite System), GALILEO or the like transmits a SS (Spread Spectrum) signal for measuring a distance to a satellite transmitting the signal. It is possible for the user to determine a position, using distances to four or more satellites. The SS signal for the satellite navigation system includes a carrier wave modulated by a pseudo-noise code. As for the length of the code, it is about 300 m for a C/A (Coarse and Access) code, and about 30 m for a P (Precision or Protect) code. The carrier wave has a wavelength of about 19 cm for the radio wave in a so-called L1 band, and about 24 cm for the radio wave in an L2 band. The code data has a unique pattern, and a receiving apparatus of a user can measure an exact distance represented by the number of chips from the apparatus itself to the satellite. The carrier wave itself is transmitted repeatedly, and the receiving apparatus of the user cannot find the number of waves from the apparatus itself to the satellite in the case of a so-called point positioning.

In the foregoing, conventional art related to the present invention has been described based on general technical information known to the applicant. To the best of applicant's memory, the applicant does not have any information to be disclosed as prior art, before the filing of this application.

Positioning using a code is realized through exact matching between a signal referred to as a replica generated in a receiving apparatus and a received signal. The receiving apparatus of a user can measure the distance to the satellite with the accuracy of up to about one hundredth of the code length or wavelength. A receiving apparatus for point positioning used in a so-called stand-alone manner is capable of positioning solely on the code data. Therefore, in that case, positioning accuracy is limited to a few meters. In order to use a phase of the carrier wave for positioning, the user must have an access to a measurement by another receiving apparatus, apply a special processing to find indefinite number of wavelengths to a satellite, and continuously track the wavelength. If a signal from the satellite should be shut off, the user must do the above-described processes again from the beginning.

Therefore, today, a user of point positioning uses positioning, knowing that the measurement based on the code transmitted from the satellite has limited accuracy.

In the so-called RTK (Real time kinematic) mode, by using a reference point, it becomes possible for the user to execute positioning using the phase of the carrier wave. In order to use such a method, however, at least five satellites must be visible to the user, and in addition, distances to at least four satellites must be continuously measured without interruption.

A process for eliminating ambiguity is not very reliable even today, and effective technique has not been proposed. Therefore, a user of a satellite navigation system cannot know for sure whether the position calculated based on the phase of the carrier wave is correct or not.

The present invention was made to solve the above-described problems, and its object is to provide an apparatus that can transmit a signal enabling higher accuracy of positioning.

Another object of the present invention is to provide an apparatus for transmitting a positioning signal that can transmit a signal attaining lower uncertainty of multiple solutions in the so-called point positioning.

A further object of the present invention is to provide a system including an apparatus that can transmit a signal enabling higher accuracy of positioning.

A still further object of the present invention is to provide a system transmitting, together with a positioning signal, information for correcting any error.

SUMMARY OF THE INVENTION

In order to solve the above-described problems, according to an aspect, the present invention provides an apparatus for transmitting a positioning signal. The apparatus comprises storing means for storing data as an object of encoding; encoding means for generating the positioning signal by encoding the data stored in the storing means based on a code for identifying a transmission source of the signal; generating means for generating a signal having periodicity; modulating means for modulating the signal having periodicity based on the positioning signal generated by the encoding means; oscillating means for generating a carrier wave; carrier modulating means for modulating the carrier wave based on the signal modulated by the modulating means; and transmitting means for transmitting the positioning signal based on the carrier wave generated by the carrier modulating means.

Preferably, the wave form of the positioning signal is a rectangular and the generating means generates a signal having a sawtooth waveform.

Preferably, the apparatus is mounted on an artificial satellite.

Preferably, the data as an object of encoding includes orbit information of the artificial satellite.

Preferably, the apparatus further comprises: receiving means for receiving the orbit information; and writing means for writing the orbit information received by the receiving means in the storing means.

Preferably, the apparatus further comprises: time keeping means for keeping time. The encoding means generates a positioning signal including the time.

Preferably, the generating means includes a quartz oscillator.

According to another aspect, the present invention provides a positioning system. The positioning system comprises: the apparatus for transmitting a positioning signal according to any of the descriptions above, and a receiver executing a positioning operation based on the positioning signal transmitted from the apparatus. The receiver includes receiving means for receiving each of the positioning signals transmitted from each of a plurality of the transmitting apparatuses, identifying means for identifying a transmission source of each of the positioning signals, oscillating means for respectively generating the same signal as each of the signal modulated by each of the positioning signals, obtaining means for obtaining the positioning signal based on the signal received by the receiving means and on the signal generated by the oscillating means, for each of the identified transmission sources, calculating means for calculating positional information of the receiver based on the positioning signal, and output means for outputting the positional information.

Preferably, the oscillating means includes generating means for generating a signal having periodicity.

Preferably, a period of the signal having periodicity is below a length of a signal corresponding to two bits in the code.

According to a still further aspect, the present invention provides a system for transmitting a positioning signal. The system comprises: a plurality of transmitting apparatuses transmitting a positioning signal. Each of the plurality of transmitting apparatuses includes storing means for storing data as an object of encoding, time keeping means for keeping time, and receiving means for receiving correction information for correcting information included in the positioning signal, the correcting information containing position correction data for correcting information representing position of the transmitting apparatus, time correction data for correcting time, and characteristic correction data for correcting information representing characteristic of a region in which the positioning signal propagates; writing means for writing the correction information received by the receiving means in the storing means; encoding means for generating the positioning signal by encoding data stored in the storing means based on a code for identifying a transmission source of the positioning signal; generating means for generating a signal having periodicity; modulating means for modulating the signal having periodicity based on the positioning signal generated by the encoding means; oscillating means for generating a carrier wave; carrier modulating means for modulating the carrier wave based on the signal generated by the modulating means; and transmitting means for transmitting the positioning signal based on the carrier wave generated by the carrier modulating means.

Preferably, each of the plurality of transmitting apparatuses is mounted on each of a plurality of artificial satellites.

Preferably, the system further comprises correction information transmitting apparatus transmitting the correction information to each of the plurality of transmitting apparatuses. The correction information transmitting apparatus including input means for receiving an input of the correction information, storing means for storing the correction information, and transmission control means for transmitting the correction information when a predetermined condition is satisfied.

Preferably, the correction information transmitting apparatus further includes detecting means for detecting an update of the correction information; and the transmission control means transmits the correction information when an update of the correction information is detected.

Preferably, the correction information transmitting apparatus further includes time keeping means for keeping time; and the transmission control means transmits the correction information at a predetermined time.

Preferably, the transmission control means includes reading means for reading the correction information from the storing means, generating means for generating data for transmission based on the read correction information, and transmitting means for transmitting by radio wave the generated data.

In the apparatus in accordance with the present invention, the positioning signal is modulated by a modulated signal. Signals transmitted by the apparatus includes the modulated positioning signal. The apparatus receiving such a signal can obtain the signal matching a signal internally generated in the receiving apparatus at the level of the phase of the positioning signal. Because of such a signal, the receiving apparatus can more accurately calculate the position information of itself.

In the positioning system in accordance with the present invention, the apparatus for transmitting the positioning signal transmits the signal modulated by a modulating signal. A receiver of such a signal can obtain the signal matching a signal internally generated in the receiving apparatus at the level of the phase of the positioning signal. Because of such a signal, the receiver can more accurately calculate the position information of itself.

In the system for transmitting a positioning signal in accordance with the present invention, the plurality of transmitting apparatuses transmitting the signal transmit, together with the signal, error information obtained before transmitting the signal. The receiving apparatus of such a signal can receive the error information together with the positioning signal. Thus, the receiving apparatus can obtain positional information with improved accuracy by taking error information into consideration when the positional information of itself is calculated. Thus, positional information with improved accuracy can be calculated.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram representing a hardware configuration of a transmitting apparatus 200 in accordance with a first embodiment of the present invention.

DESCRIPTION OF THE PREFERRED EMBODIMENTS

Figure 1:
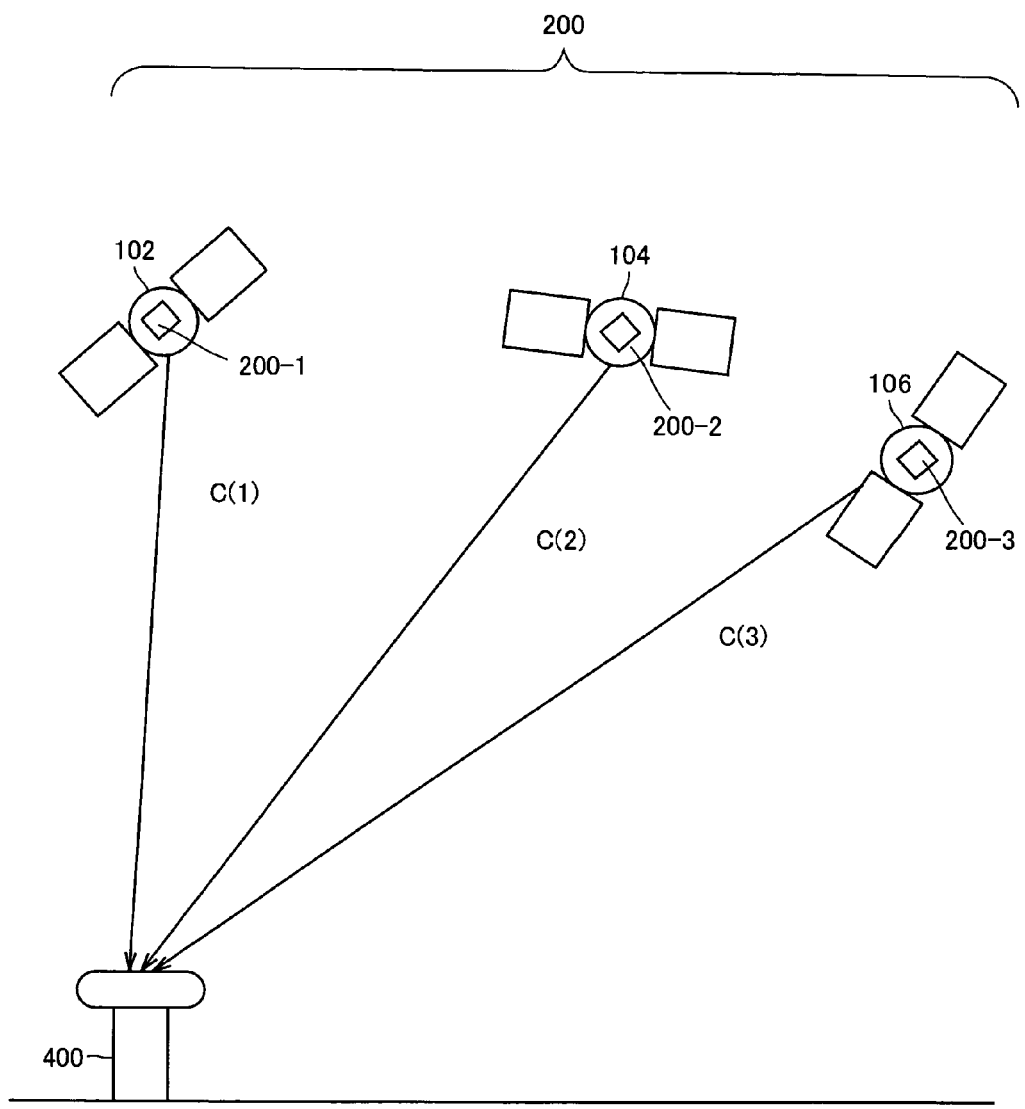
FIG. 1 schematically shows a configuration of a satellite positioning system including the transmitting apparatus in accordance with an embodiment of the present invention.

Referring to FIG. 1, the satellite positioning system including the transmitting apparatus in accordance with an embodiment of the present invention will be described. FIG. 1 schematically shows the system configuration. The system includes a transmitting apparatus 200-1 mounted on an artificial satellite 102, a transmitting apparatus 200-2 mounted on an artificial satellite 104, and a transmitting apparatus 200-3 mounted on an artificial satellite 106. Each transmitting apparatus transmits a positioning signal, as will be described later. The signal includes a so-called spread spectrum signal. The signal is, for example, a GPS signal. However, the signal is not limited to the GPS signal. In the following, for simplicity of description, the so-called GPS will be described as an example. The present invention, however, is applicable to other satellite positioning systems. In addition, the invention is also applicable to non-satellite positioning system, such as a ground-based system.

Here, artificial satellites 102, 104 and 106 are communication satellites, and they may be other satellites. For instance, they may be satellites that constitute the quasi-zenith system presently contemplated in Japan. At least one of the satellites constituting this system navigates to be seen near the zenith in Japan at any time, and therefore, the signal from the satellite navigating near the zenith can readily be received even at an urban area where a large number of tall buildings stand. If any other system similar to the quasi-zenith system is implemented in other country, the satellites may be the ones that constitute the corresponding system.

Transmitting apparatuses 200-1, 200-2 and 200-3 (in the following, also generally referred to as transmitting apparatus 200) output carrier waves C(1), C(2) and C(3) generated by encoding using a code for identifying the apparatus itself (a so-called pseudo-noise code (PRN)), respectively. Each carrier wave is received by a GPS receiver 400 having a function of receiving the signals on the ground.

Here, each of the carrier waves C(1), C(2) and C(3) generally refers to two carrier waves. Specifically, each carrier wave includes L1 band and L2 band. Each carrier wave is transmitted by spread spectrum communication system using pseudo-noise code. Here, carrier waves transmitted from respective satellites do not interfere even when they are transmitted with the same frequency.

On each carrier wave, two different signals for positioning, for example, C/A code and P code are superposed in one aspect of the embodiment related to a GPS system. The signals are not limited to C/A code and P code. By way of example, the carrier wave of L1 band has the C/A code, a navigation message and the P code superposed thereon. The carrier wave of L2 band only has the P code superposed. The carrier wave of L1 band is modulated by, for example, quadrature modulation. Specifically, the carrier wave is divided into two, to have a phase difference of 90°. For instance, one is a sinusoidal wave, and the other is a sinusoidal wave shifted by 90°. Here, the divided carrier waves become independent from each other. Using the C/A code and the navigation message, the former is subjected to PSK (Phase Shift Keying) modulation, which will be described later, and using the P code, the latter carrier wave is modulated, so that the carrier waves can be transmitted from the transmitting apparatus 200 without interference. The carrier wave of L2 band carries the P code only, and therefore, quadrature modulation such as described above is unnecessary.

Here, the navigation message refers to data such as ephemeris, which is orbit information of the satellite, necessary for calculation and the like for positioning in the GPS. The orbit information includes, in addition to the ephemeris, an almanac, which is a schematic orbit information of all satellites other than the satellite of interest itself. Ephemeris is frequently updated by a control station on the ground and hence, this information is highly accurate. The almanac is an epitomization and not frequently updated, and therefore, it is kept unchanged for a considerably long time.

The navigation message includes, in addition to the information related to the orbit, parameters for ionosphere correction, correcting value for a clock mounted on a satellite, and health information representing a state of operation of the satellite itself. The health information includes 8-bit information representing the state of operation of the satellite or the state of navigation message, and 6-bit information representing the state of operation of all satellites constituting the GPS, together with the almanac data.

The navigation message is digital data (50 bps) having lower bit rate than the C/A code or P code. As an example, a basic configuration of the navigation message is a main frame of 1500 bits. In this case, it takes 30 seconds to receive the main frame. The main frame includes the orbit information. Therefore, it follows that the orbit information is transmitted in every 30 seconds.

The main frame includes five sub frames consisting of 300 bits. The fourth and fifth sub frames have their contents (so-called pages) changed successively. The contents include 25 pages. Therefore, contents of each sub frame turn back to the original state after 25 changes. When the main frame is received 25 times, the whole contents can be received. When it takes 30 seconds to receive the main frame, in order to receive all the contents, it takes 12 minutes and 30 seconds (=30 seconds×5).

Referring to FIG. 2, transmitting apparatus 200 in accordance with the embodiment of the present invention will be described. FIG. 2 is a block diagram representing a hardware configuration of transmitting apparatus 200.

Transmitting apparatus 200 includes an oven controller crystal oscillator (OCXO) 210, a voltage controlled oscillator (VCO) 220, a code generator 230, multipliers 240 and 260, a memory 250 storing the navigation message, a transmitting portion 280, and an antenna 290.

OCXO 210 has a thermostatic oven that keeps the temperature of a quartz resonator constant, and oscillates such that variation in output frequency caused by the ambient temperature change is minimized. A signal from OCXO 210 is input to VCO 220. VCO 220 outputs a signal modulated in accordance with the signal (such as a voltage for changing frequency) from OCXO 210. The signal from VCO 220 is input to multiplier 240.

Code generator 230 outputs code patterns for respectively identifying transmitting apparatuses 200-1 to 200-3 to multiplier 240. Multiplier 240 generates a signal for transmission, from the signal from VCO 220 and the code pattern from code generator 230. The generated signal is input to multiplier 260.

Multiplier 260 generates a signal to be transmitted to the space, based on the signal from multiplier 240 and the navigation message stored in memory 250. The signal output from multiplier 260 is input to transmitting portion 280. Transmitting portion 280 includes a high-power antenna (not shown), and enhances the output of the input signal and transmits the same. The signal is broadcast to the outer space through antenna 290.

Figure 3A:
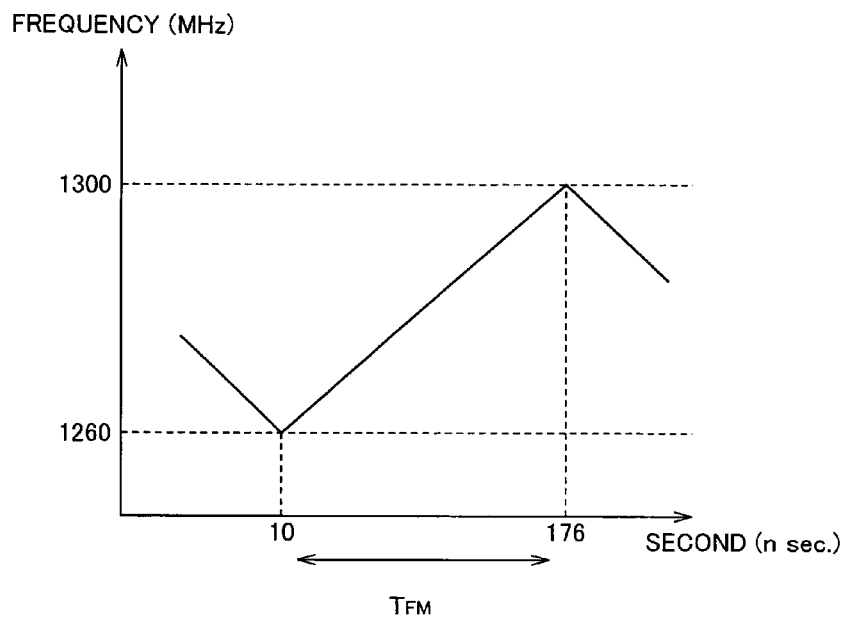
FIG. 3A shows a sawtooth waveform generated by transmitting apparatus 200.
Figure 3B:
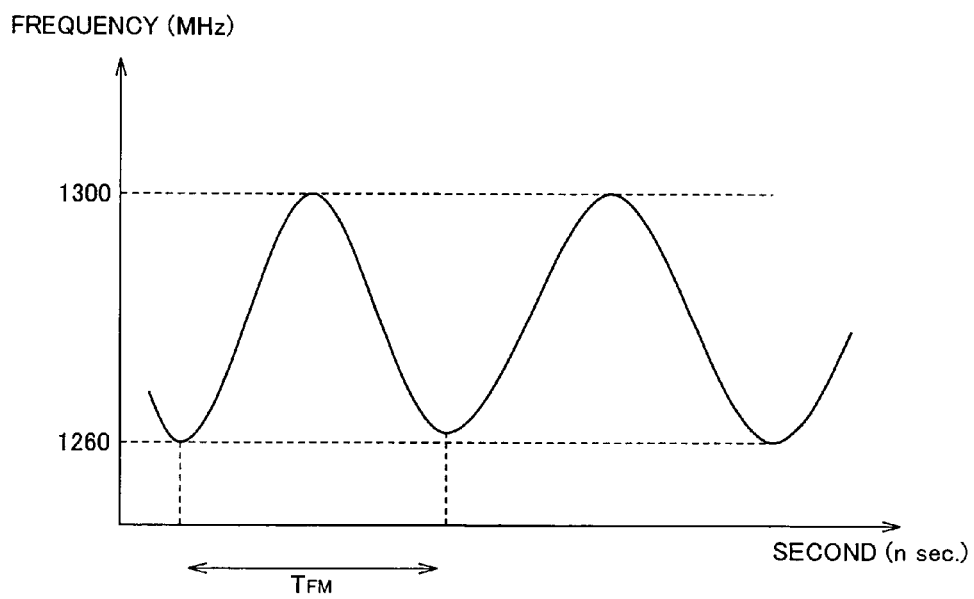
FIG. 3B shows a sinusoidal waveform generated by transmitting apparatus 200.

Referring to FIGS. 3A and 3B, the signal output from OCXO 210 will be described. FIG. 3A shows a waveform when OCXO 210 outputs a so-called sawtooth wave. FIG. 3B shows a waveform when OCXO 210 outputs a sinusoidal wave.

As shown in FIG. 3A, the signal output from OCXO 210 continuously changes from the frequency of 1260 MHz to 1300 MHz in a half period $T_{FM}$. When a sinusoidal wave is output as shown in FIG. 3B, the sinusoidal wave changes between the frequencies shown in FIG. 3A in a period $T_{FM}$. When the signal having such a waveform is input from OCXO 210 to VCO 220, the signal output from VCO 220 is modulated.

The format of the signal provided from transmitting apparatus 200 transmitting the GPS signal will be described. As described above, all the satellites forming the satellite positioning system transmit signals of the same frequency. As an example of the transmitting method, spread spectrum communication system is used, and therefore, even when signals of the same frequency are transmitted, interference can be prevented.

Specifically, the carrier wave of L1 band is modulated such that when the sign of digital data containing the C/A code and the navigation message is inverted, the phase of the carrier wave is reversed (PSK modulation). When the phase of the carrier wave is reversed abruptly, spectrum width of radio wave widens. Thus, power per unit frequency from transmitting apparatus 200 becomes smaller, and hence, even when there are radio waves from various satellites, mutual interference can be avoided.

Figure 4:
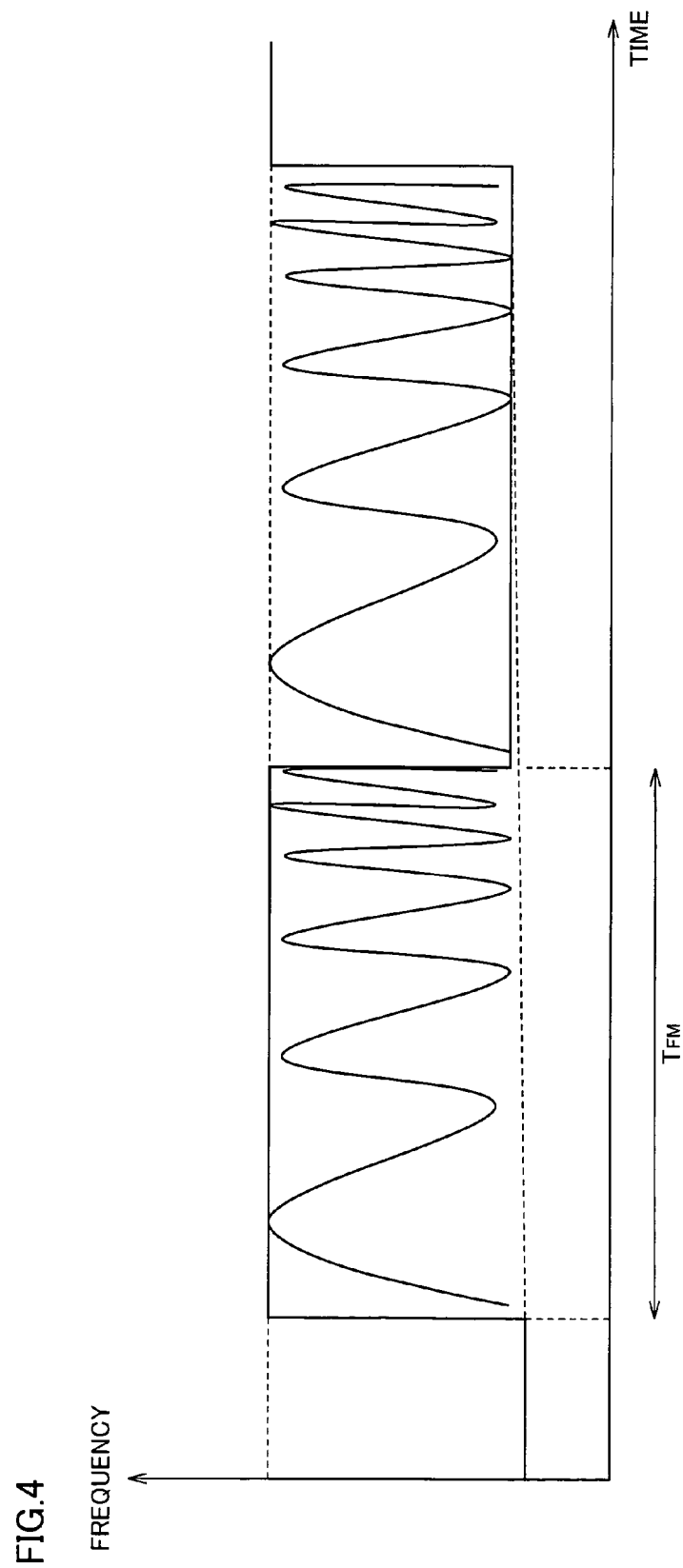
FIG. 4 is a schematic illustration of the waveform of a carrier wave generated by transmitting apparatus 200 in accordance with the first embodiment of the present invention.

Referring to FIG. 4, a structure of a code chip generated by transmitting apparatus 200 in accordance with the embodiment of the present invention will be described. FIG. 4 schematically shows schematic structures of a code chip and its frequency modulated signal pattern. The signal is modulated by the output signal from OCXO 210.

Before the signal is input from OCXO 210, VCO 220 oscillates a signal with a predetermined period. Here, when a control signal from OCXO 210 is input to VCO 220, VCO 220 outputs a signal such as shown in FIG. 3A or FIG. 3B. The signal from VCO 220 is input to multiplier 240.

When the signal output from VCO 220 is input to multiplier 240, multiplier 240 encodes the signal and data from code generator 230, namely data for identifying transmitting apparatus 200 or data for identifying the artificial satellite on which transmitting apparatus 200 is mounted, for example, by a spread spectrum communication technology. The data from code generator is modulated and change in phase inside the code chip is generated (a curve in FIG. 4). Multiplier 260 multiplies the modulated data and a navigation message. The signal is emitted from an antenna of transmitting apparatus 200. When the signal as such is received by the receiver, the receiver performs code matching and, in addition, a process for specifying the phase of the code.

Figure 5:
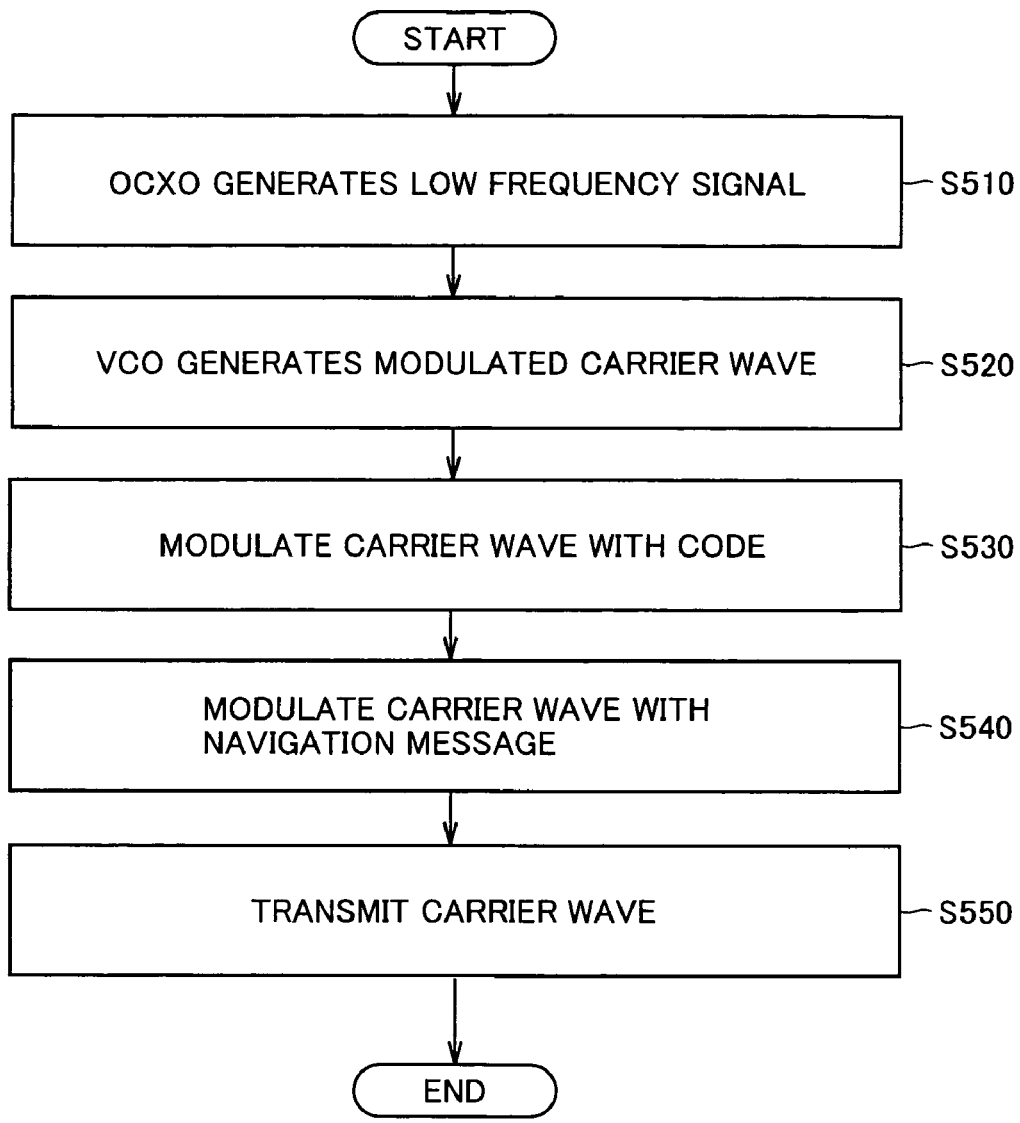
FIG. 5 is a flow chart showing process steps executed by transmitting apparatus 200 in accordance with the first embodiment of the present invention.

Referring to FIG. 5, a control structure of transmitting apparatus 200 in accordance with the present invention will be described. FIG. 5 is a flow chart representing process steps executed by transmitting apparatus 200.

In step S510, OCXO 210 outputs a signal (for example, a voltage) for linearly modulating the signal from VCO 220. In step S520, VCO 220 generates a frequency modulated signal based on the signal from OCXO 210, and outputs the signal to multiplier 240.

In step S530, multiplier 240 modulates the signal from VCO 220 based on the code from code generator 230. In step S540, multiplier 260 further modulates the signal based on the signal output from multiplier 240 and the navigation message stored in memory 250. The signal is sent out to transmitting portion 280. In step S550, transmitting portion 280 sends the signal to the outer space through antenna 290.

In this manner, the signal transmitted from transmitting apparatus 200 is received by a user's receiver. The receiver may be an apparatus that can receive the GPS signal, such as a portable telephone having the GPS function or a terminal dedicated for the GPS.

The receiver generates a C/A code pattern (so called "a replica signal") of the satellite to be received for timing adjustment. Specifically, code-synchronization is established. Here, synchronization is established, for example, by a DLL (Delay Lock Loop) circuit. When the code pattern and the code transmitted from the satellite synchronize, the radio wave of which phase has been frequently reversed turns to a sinusoidal wave having uniform waveform, enabling demodulation of the navigation message. At this time, the timing of the C/A code generated inside the receiver becomes the time of arrival of the radio wave (C/A code) from the satellite positioned by the receiver. Such synchronization is possible as the C/A pattern is known in advance.

Figure 6:
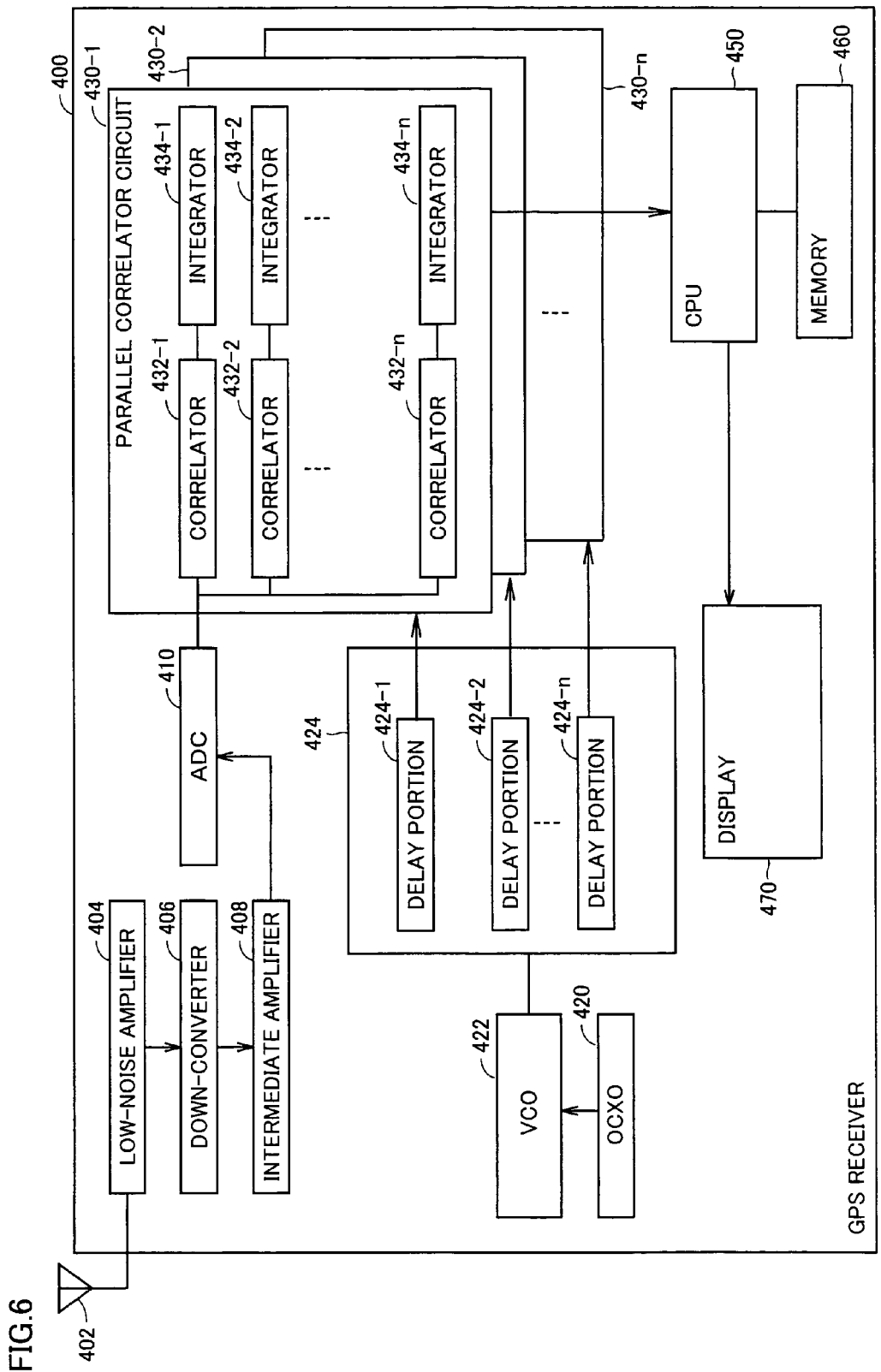
FIG. 6 is a block diagram representing a hardware configuration of a GPS receiver 400 capable of receiving a positioning signal, transmitted from transmitting apparatus 200.

Here, referring to FIG. 6, GPS receiver 400 that can receive the signal for positioning transmitted from transmitting apparatus 200 in accordance with the present embodiment will be described. FIG. 6 is a block diagram representing a hardware configuration of GPS receiver 400. As can be seen from FIG. 6, GPS receiver 400 is implemented, for example, by modifying a known multi-correlator technique.

GPS receiver 400 includes an antenna 402, a low-noise amplifier 404, a down-converter 406, an intermediate amplifier 408, an ADC (Analog to Digital Converter) 410, an OCXO 420, a VCO 422, a delay circuit 424, a plurality of parallel correlator circuit 430-1, 430-2, . . . 430-n, a CPU (Central Processing Unit) 450, a memory 460, and a display 470. Delay circuit 424 includes a plurality of delay portions 424-1, 424-2, . . . , 424-n. Each of the delay portions corresponds to each of the parallel correlator circuit. Each of delay portions 424-1, 424-2, . . . , 424-n generates digital data based on the analog signal output from VCO 422. Each of the generated digital data has a delay among other data. The digital data is input to parallel correlator circuit 430-n. For example, the data output from delay portion 424-1 is input to parallel correlator circuit 430-1 for calculation of correlations between the digital data from ADC 410. Memory 460 is implemented, for example, by a flash memory, and stores externally input ephemeris, software for executing an operation for specifying position, and so on. The information stored in memory 460 may be obtained through a communication network such as the Internet, from an information provider or a system developer that already have such information. Alternatively, the information may be obtained from the GPS signal. More specifically, when GPS receiver 400 is a portable telephone having the GPS function, by way of example, the information may be stored by the user or manufacturer of the telephone in GPS receiver 400.

The positioning signal is received by antenna 402. The signal is input to low-noise amplifier 404. Low-noise amplifier 404 cuts the noise, filters and amplifies the signal, and outputs the amplified signal to down-converter 406. Down-converter 406 converts the signal to an intermediate frequency signal, and outputs the result to intermediate amplifier 408. Intermediate amplifier 408 amplifies the input intermediate frequency signal and outputs the result to ADC 410. ADC 410 samples the input signal and converts to a digital signal. The digital signal is input to parallel correlator circuit 430.

OXCO 420 generates a signal for modulating the local oscillating signal generated by VCO 422. The signal is a sawtooth wave or a periodically changing signal as shown, for example, in FIG. 3, but it is not limited thereto. Specifically, the signal for modulating the local oscillating signal may be any signal that can continuously change the phase of an oscillating signal output from VCO 422 so long as the signal from OCXO 420 can generate a replica signal of the signal generated by OCXO 210. Here the replica signal means the one whose wave form is the same as that of the signal output from OCXO 210.

VCO 422 generates a local oscillating signal modulated by the signal from OCXO 420. The generated signal is input to delay circuit 424. Delay circuit 424 generates a signal that represents all the possible phase delays based on the input carrier wave signal, and outputs the same to parallel correlator circuit 430. The delays are within one chip of a code included in the positioning signal transmitted from satellites.

Parallel correlator circuit 430 includes a plurality of correlators 432-1 to 432-n arranged parallel to each other to enable simultaneous execution of a process for detecting delay possibly experienced when the positioning signal propagates. Each correlator is hardware-implemented. The correlator may also be software-implemented using a processor and programs for calculating correlations. Respective correlators correspond to the possible propagation delay time of positioning signals from a plurality of artificial satellites 102, 104 and 106. Therefore, after the signal mentioned above is input to parallel correlator circuit 430, each correlator executes a process to establish correlation with a locally generated PRN code, whereby the propagation delay times of the positioning signals transmitted from a plurality of satellites (corresponding to phase delay of the signal from the locally generated PRN code) can be calculated in parallel.

The output from parallel correlator circuit 430 is accumulated, by way of example, over a plurality of PRN code periods with phase aligned (in coherent manner) for in-phase component (I component) and quadrature component (Q component) period by period of the PRN code, by an integrator 434-1. Outputs from respective integrators 434-1 to 434-n are each squared in an operator (not shown), and an absolute value is taken out. The taken outputs are accumulated by an accumulator (not shown) in a non-coherent manner. After the accumulating process by the accumulator, noise in the signals are suppressed, an output of a correlator corresponding to the phase delay described above is monitored as a peak, and stored in memory 460.

Specifically, in the example shown in FIG. 1, when correlation among carrier waves C(1), C(2) and C(3) is calculated by parallel correlator 430, signals from three artificial satellites 102, 104 and 106 are calculated in parallel, and peaks corresponding to respective signals are detected.

Phase delay of positional signals from specific artificial satellites 102, 104 and 106, that is, propagation delay times of positional signals can be known. Further, based on the information stored in advance in memory 460, orbit information of each artificial satellite can be obtained. Here, combinations of satellite positions specified by the orbit information based on the received signals are in finite number. Therefore, similar to a conventional signal processing such as GPS signal processing, an operation is possible to specify the position of GPS receiver 400. This operation is executed, for example, by CPU 450.

More detailed, exemplary operation of parallel correlator 430 is as follows.

An IF input sample having an intermediate frequency is multiplied with an output from a numerical control oscillator (hereinafter denoted by NCO) in ADC 410, and I component and Q component are separated.

An output of the re-sampler is input to correlators 432-1 to 432-n calculating convolution between the received positioning signal and a set of reference waveforms (PRN codes) for artificial satellites 102, 104 and 106 that are at visible positions. Each channel includes a plurality of delay elements (not shown). An operation logic block (not shown) calculates correlation between the entire characteristic period of the input data and a full PRN code sequence for a desired satellite. Here, the "entire characteristic period (epoch)" refers to a period that corresponds to one period of the PRN code, and when one period of a PRN code consists of 1024 chips (bits).

In each clock period in which parallel correlator circuit 430 operates, a result of calculation of a new correlation value for one specific delay time is generated and stored in memory 460. Therefore, at the end of the entire characteristic period, memory 460 come to have a full set of correlation results for all possible delays stored therein. The sequence of correlation results corresponds to convolution between the input signals and the reference waveforms locally generated by the PRN code generator.

In this manner, by the two time-averaging processes, that is, accumulating processes performed by integrators 434-1 to 434-n and the accumulator (not shown), detection sensitivity can be improved.

Though a main frame of a GPS signal as one type of the positioning signals has the period of 30 seconds, the delay time from each satellite can be specified within, for example, 1 second, because of such a configuration of parallel correlator circuit 430 as described above. Therefore, as compared with the method that necessitates extraction of navigation message directly from the received GPS signal, the position calculating process can be done at a higher speed.

Again referring to FIG. 6, CPU 450 executes an operation for specifying the position of receiving apparatus 400, based on the information stored in memory 460 and on the information output from parallel correlator circuit 430. This process is well known, and therefore, description thereof will not be given here. Further, CPU 450 executes a process for generating data to display an image on display 470. By way of example, this process is for generating data for display based on the calculated positional information and image data obtained separately. The data for display is stored in a VRAM (Video Random Access Memory) (not shown). Display 470 displays an image based on the data.

Figure 7:
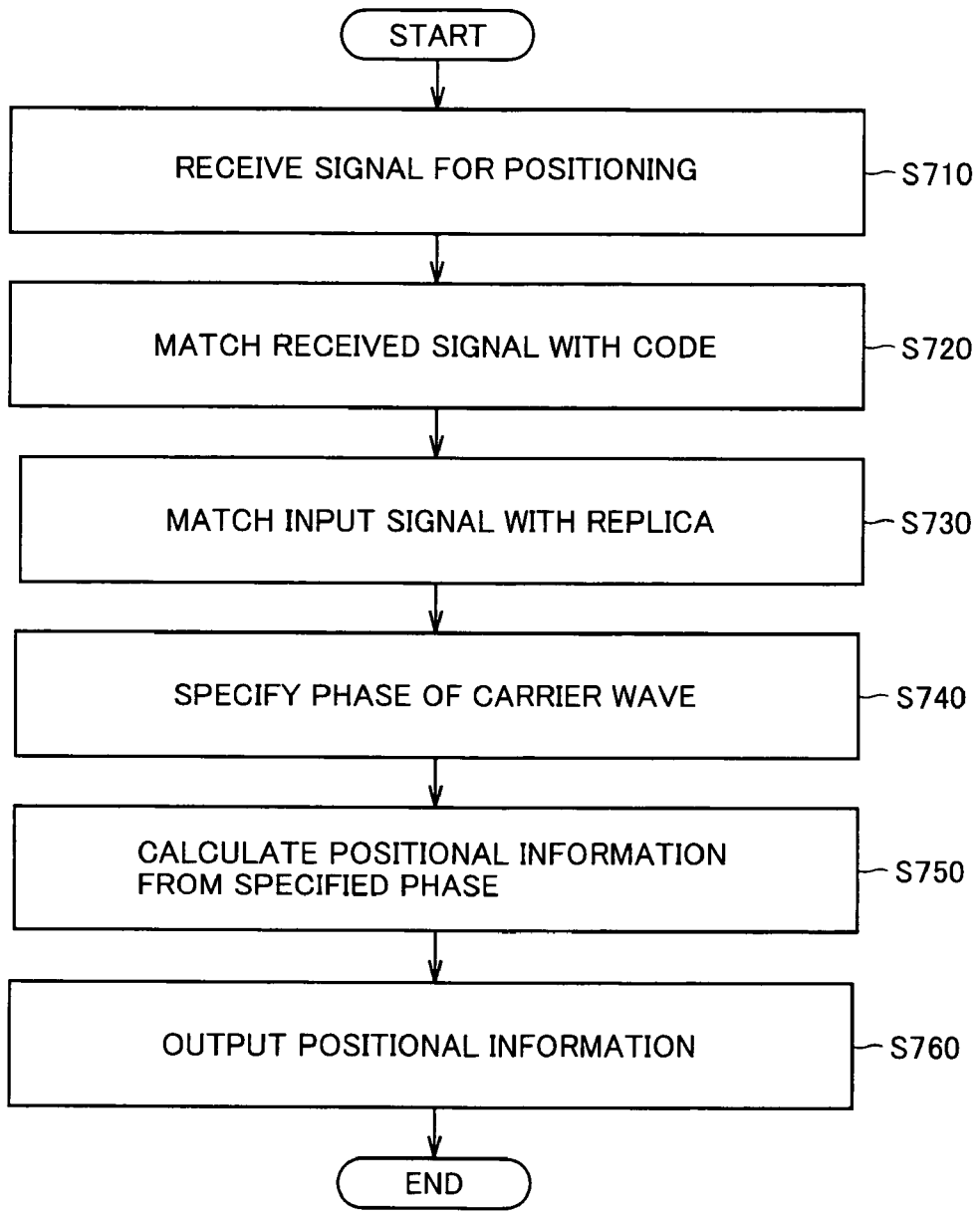
FIG. 7 is a flow chart representing process steps executed by GPS receiver 400 receiving the signal for positioning from transmitting apparatus 200.

Referring to FIG. 7, a control structure of the receiving apparatus that can receive the positioning signal from transmitting apparatus 200 in accordance with the present embodiment will be described. FIG. 7 is a flow chart representing process steps executed by GPS receiver 400 as an example of the apparatus.

In step S710, GPS receiver 400 receives the positioning signal through antenna 402. In step S720, GPS receiver 400 matches, in parallel correlator circuit 430, the received signal with the code. In step S730, GPS receiver 400 matches, in parallel correlator circuit 430, the replica code generated inside with the received code.

In step S740, GPS receiver 400 specifies the phase of the code in parallel correlator circuit 430. Specifically, GPS receiver 400 generates a code pattern having the same pattern as that of the signal modulated in transmitting apparatus 200, generates a finite number of signals with the phase shifted inside the code chip, and using a so-called multi-correlator technique, detects a signal of which phase fully matches. The positioning signal can be specified at the level of the phase of the signal, namely code chip level.

In step S750, GPS receiver 400 has the CPU 450 calculate the positional information. In step S760, GPS receiver 400 has the positional information output to display 470.

By the transmitting apparatus in accordance with the present embodiment, as the signal of the code is modulated as described above, uncertainty of the code pattern from a specific satellite can be eliminated in the phase level.

As described above, in transmitting apparatus 200 in accordance with the present embodiment, the signal, which is multiplied with the code, is frequency modulated. This modulation is performed by successively changing a frequency of a local oscillating signal. Such modulation is realized by applying, to the local oscillating signal before modulation, a sawtooth wave signal or a signal that varies periodically (FIGS. 3A and 3B).

If transmitting apparatus 200 is realized as a GPS, navigation message, C/A code, or P code and the signal from VCO 220 are multiplied. The multiplied signal is then transmitted. When the signal is transmitted by transmitting apparatus 200, GPS receiver 400, which can receive the signal, generates a local oscillating signal internally and matches the generated signal with the received signal.

In this manner, when the code pattern of the C/A code transmitted from transmitting apparatus 200 mounted on a specific artificial satellite is specified, GPS receiver 400 detects the phase of the code pattern, using the plurality of signals obtained by delaying the phase of the code pattern, using the so-called multi-correlator technique. Thus, the uncertainty of multiple solutions can be reduced from the C/A code level having the specific code pattern to the phase level of each chip. Namely, an apparatus transmitting a positioning signal that can reduce uncertainty of multiple solutions can be provided.

Further, as the uncertainty is reduced, accuracy of the measurement can be improved even in the so-called point positioning. As a result, it becomes possible for GPS receiver 400 to calculate accurate positional information, without necessitating simultaneous positioning at a reference position. Specifically, GPS receiver 400 can obtain three-dimensional positional information using signals from four satellites. Alternatively, GPS receiver 400 can obtain two-dimensional positional information using signals from three satellites.

It is noted that GPS receiver 400 receiving the signal from transmitting apparatus 200 in accordance with the present embodiment is not limited to the one described above. Specifically, GPS receiver 400 may store a PRN signal obtained in the past from the same satellite. The signal includes information representing a shift in frequency caused by Doppler effect between the receiver and the artificial satellite, information representing difference of time information and so on. By using such a signal, point positioning can be realized, considering relative velocity between the receiver and the artificial satellite.

Specifically, no matter whether the GPS user is moving or stationary, there is a relative velocity between the receiver and the artificial satellite. Therefore, the signal from the artificial satellite involves frequency shift caused by the so-called Doppler effect. The frequency shift becomes larger when the carrier wave has higher frequency. The shift $\Delta f$ is given by the equation $\Delta f = f \rho'/c$. Therefore, when the process described above is executed using the shift after a signal is received from the artificial satellite, generation of error can be suppressed by correcting the data with the shift.

Second Embodiment

In the following, the second embodiment of the present invention will be described. The transmitting apparatus in accordance with the present embodiment differs from the first embodiment above in that it has a function of receiving data for correcting the data stored in the memory and a function of generating corrected data using the said data.

Figure 8:
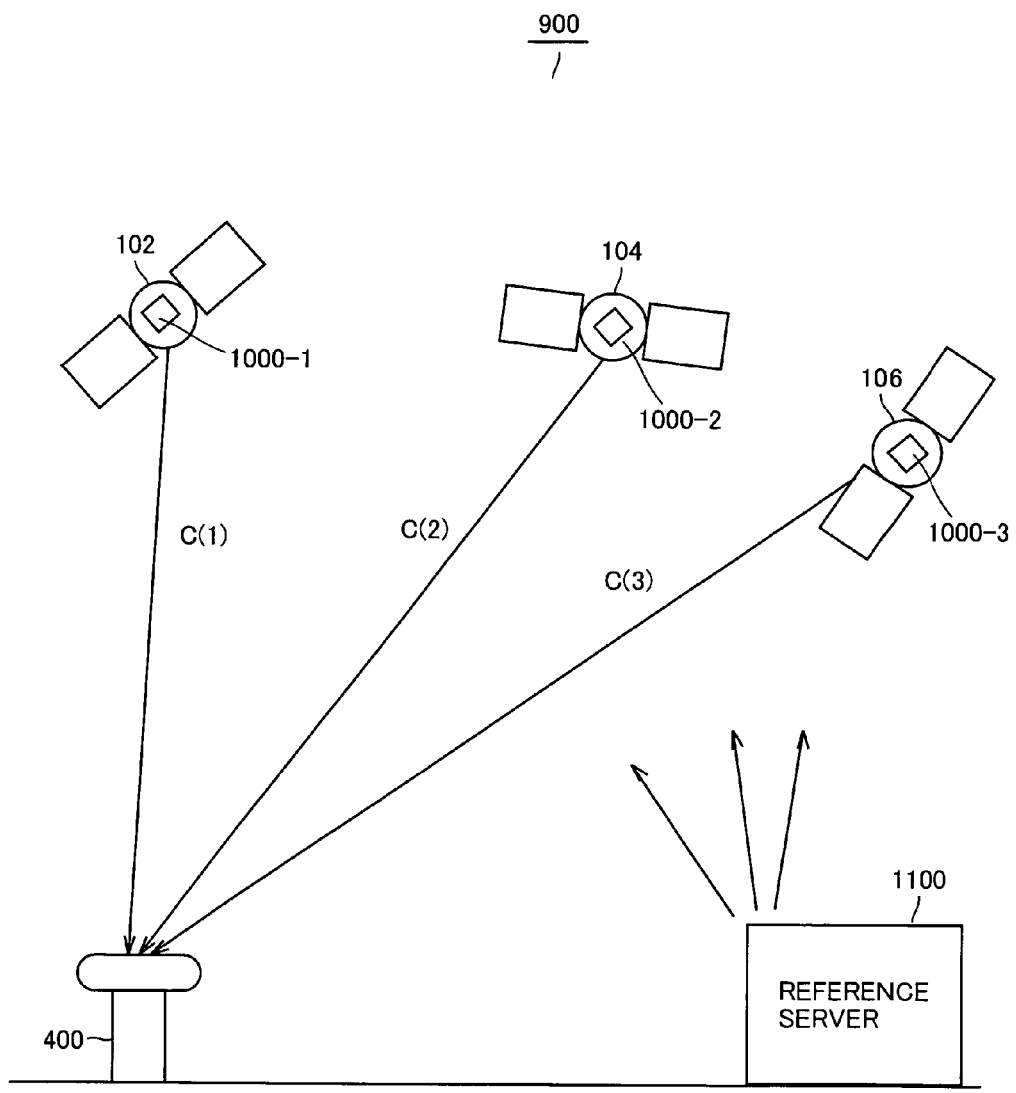
FIG. 8 is a block diagram representing a schematic configuration of a system 900 in accordance with a second embodiment of the present invention.

Referring to FIG. 8, the system in accordance with the present embodiment will be described. FIG. 8 is a block diagram representing a schematic configuration of system 900 including transmitting apparatuses 1000-1, 1000-2, and 1000-3 capable of transmitting a positioning signal and information for correcting error. It is noted that components same as those of the first embodiment described above are denoted by the same reference characters. They have the same functions and effects. Therefore, description thereof will not be repeated.

System 900 includes transmitting apparatus 1000-1 mounted on artificial satellite 102, transmitting apparatus 1000-2 mounted on artificial satellite 104, and transmitting apparatus 1000-3 mounted on artificial satellite 106. In the following, the transmitting apparatus is generally referred to as transmitting apparatus 1000. System 900 further includes a reference server 1100 that can transmit information for correcting error to transmitting apparatus 1000. Reference server 1100 is connected to a communication network (not shown).

Figure 9:
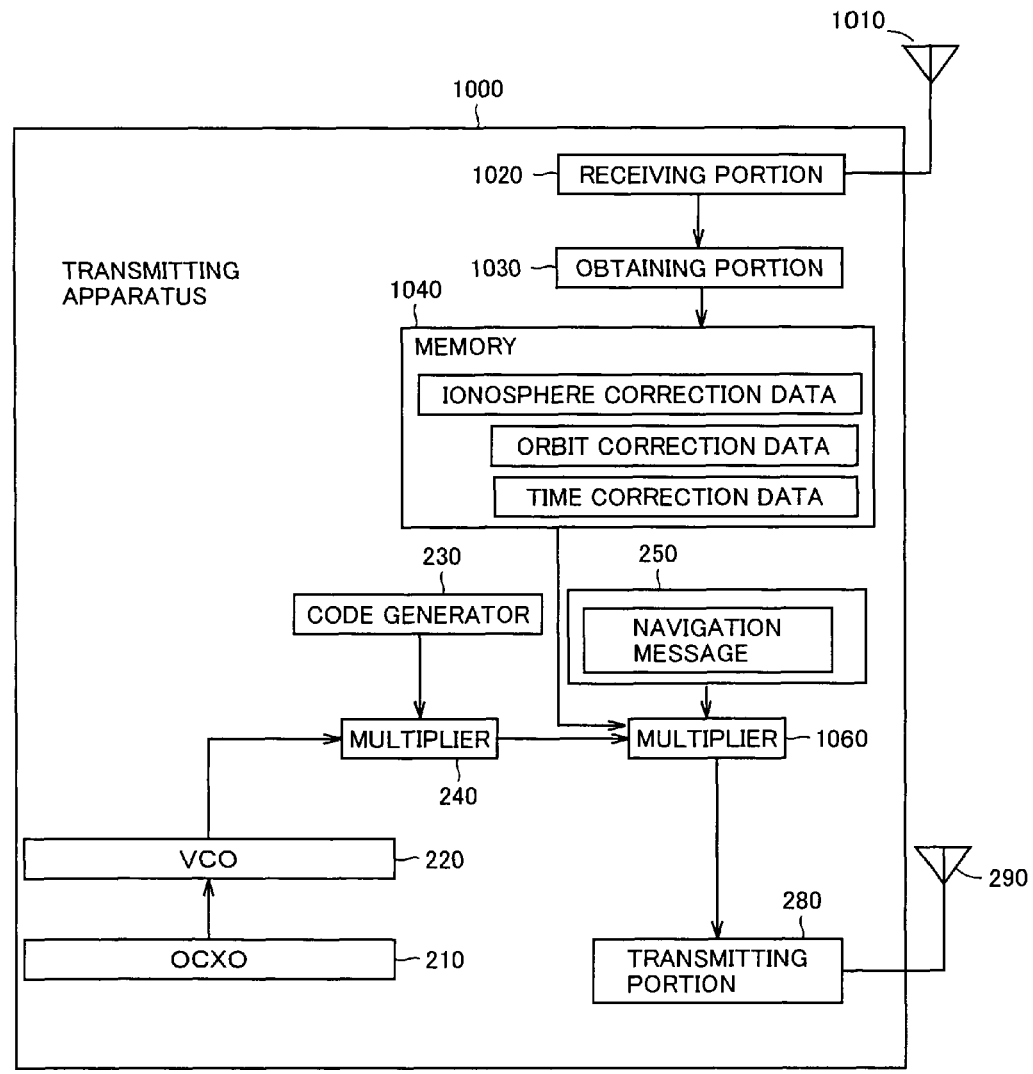
FIG. 9 is a block diagram representing a hardware configuration of a transmitting apparatus 1000 in accordance with the second embodiment of the present invention.

Referring to FIG. 9, transmitting apparatus 1000 in accordance with the present embodiment will be described. FIG. 9 is a block diagram representing a hardware configuration of transmitting apparatus 1000. It is noted that the same components as those shown in the first embodiment described above are denoted by the same reference characters. They have the same functions and effects. Therefore, description thereof will not be repeated.

Transmitting apparatus 1000 includes, in addition to the configuration shown in FIG. 2, an antenna 1010, a receiving portion 1020, an obtaining portion 1030, a memory 1040, and a multiplier 1060. Receiving portion 1020 receives through antenna 1010 the signal including the data for correction, transmitted from reference server 1100. The received signal is input to obtaining portion 1030. The obtaining portion 1030 extracts data for correction from the signal, and successively stores the same in a prescribed area of memory 1040. The data for correction includes, by way of example, orbit information correction data, time correction data, and ionosphere correction data, as will be described later. These data are stored at every reception by receiving portion 1020, in the prescribed area of memory 1040.

Multiplier 1060 generates a signal for transmission based on the navigation message stored in memory 250, data for correction stored in memory 1040, and the carrier wave output from multiplier 240, and outputs the signal to transmitting portion 280. Transmitting portion 280 transmits the signal through antenna 290, as in the process described above.

Figure 10:
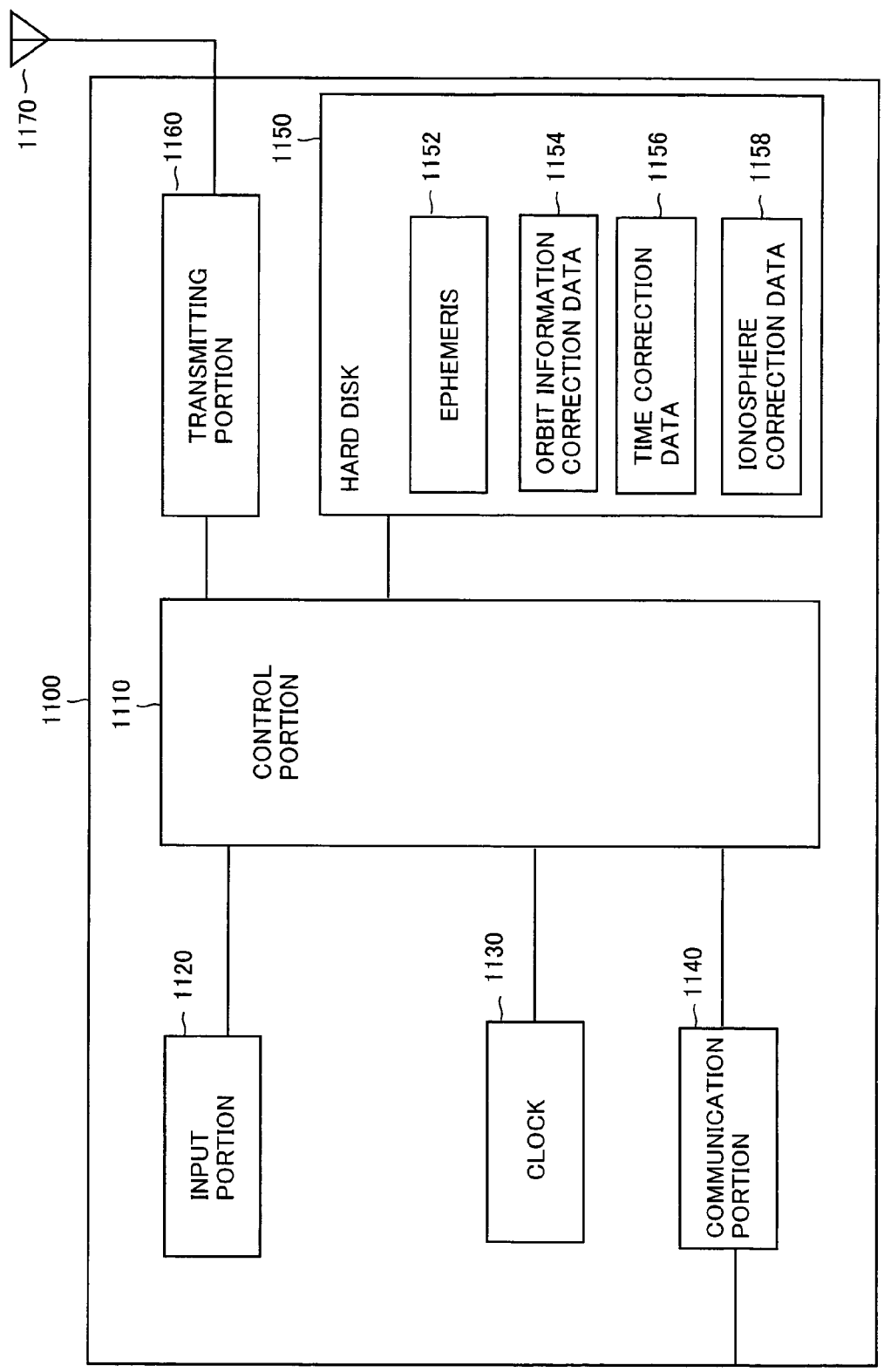
FIG. 10 is a block diagram representing a hardware configuration of a reference server 1100 in accordance with the second embodiment of the present invention.

Referring to FIG. 10, reference server 1100 in accordance with the present embodiment will be described. FIG. 10 is a block diagram representing a hardware configuration of reference server 1100. Reference server 1100 is implemented, for example, by a computer or the like having functions of data operation and communication.

Reference server 1100 includes a control portion 1110, an input portion 1120, a clock 1130, a communication portion 1140, a hard disk 1150, a transmitting portion 1160, and an antenna 1170. Hard disk 1150 includes areas 1152 to 1158.

Control portion 1110 is realized, for example, by a CPU (Central Processing Unit). Control portion 1110 controls processes for realizing the data operation function and the communication function. Control portion 1110 stores data input through input portion 1120 or communication portion 1140 in a prescribed area of hard disk 1150. Control portion 1110 generates data for correction and transmits the data regularly, based on time information from clock 1130 or in response to detection of data update in hard disk 1150.

Input portion 1120 is implemented, for example, by a keyboard, mouse or the like. Clock 1130 obtains time information, and outputs to control portion 1110. Control portion 1110 executes, for example, a periodical transmitting process or regular data update in hard disk 1150, based on the time.

Communication portion 1140 is connected to a communication network (not shown) such as the Internet, and receives input of information necessary for positioning, regularly or on real-time basis. The input data is stored in hard disk 1150. The information includes orbit information (ephemeris, almanac) of artificial satellites 102, 104 and 106, data for correcting orbit information, data for correcting time information, data for correcting ionosphere information, and so on.

Hard disk 1150 stores the data described above, in respective areas. By way of example, the ephemeris is stored in area 1152. The orbit information correction data is stored in area 1154. The time correction data is stored in area 1156. The ionosphere correction data is stored in area 1158. When each data is stored, it may be associated with time information from clock 1130. By this approach, history of the updated information can also be held, and therefore, data analysis at a time of malfunction, for example, can be executed efficiently.

Transmitting portion 1160 enhances the output of a generated signal based on an instruction from control portion 1110, and sends the signal. The signal is emitted from antenna 1170.

Figure 11:
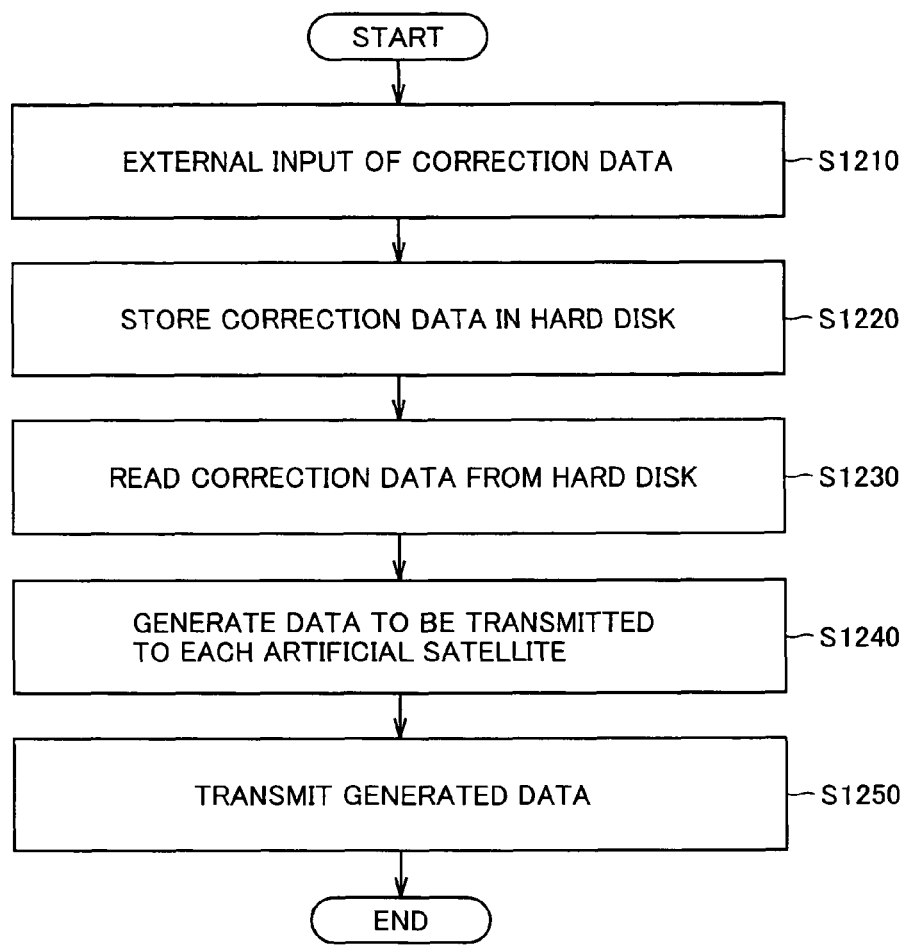
FIG. 11 is a flow chart representing process steps executed by a control portion 1110 of reference server 1100 in accordance with the second embodiment of the present invention.

Next, referring to FIG. 11, the control structure of reference server 1100 will be described. FIG. 11 is a flow chart representing process steps executed by control portion 1110 of reference server 1100. The process is for transmitting data for correction to an artificial satellite. The process may be executed at every prescribed interval, or may be executed every time any information in hard disk 1150 is updated. Here, an example when data is updated will be described.

In step S1210, control portion of reference server 1100 receives an external input of data for correction. In step S1220, control portion 1110 stores the input data for correction in a prescribed area of hard disk 1150. In step S1230, control portion 1110 reads the data for correction from hard disk 1150. In step S1240, control portion 1110 generates data to be transmitted to each artificial satellite. In step S1250, control portion 1110 transmits the generated data through transmitting portion 1160. In this manner, from reference server 1100 provided on the ground, data for correction is transmitted to artificial satellites 102, 104 and 106 navigating along a predetermined orbit.

Figure 12:
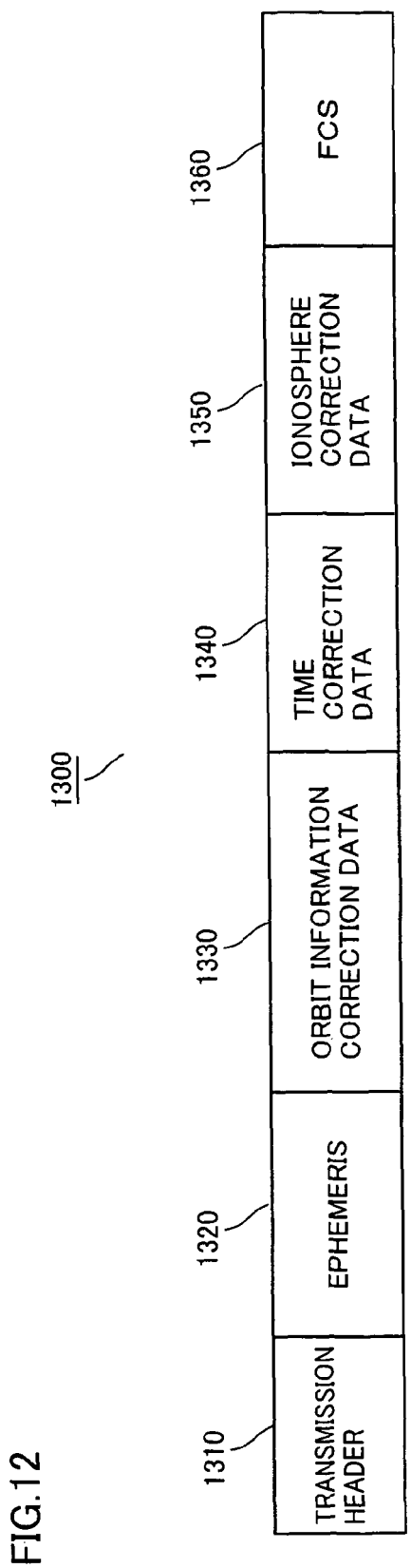
FIG. 12 schematically shows a packet configuration of correction data transmitted from reference server 1100.

Here, referring to FIG. 12, a structure of the data for correction transmitted from reference server 1100 will be described. FIG. 12 is a schematic illustration of a packet structure of correction data 1300.

Correction data 1300 includes areas 1310 to 1360. A transmission header is stored in area 1310. The ephemeris data is stored in area 1320. Orbit information correction data is stored in area 1330. Time correction data is stored in area 1340. Ionosphere correction data is stored in area 1350. Frame check sequence data (FCS) is stored in area 1360. The configuration of data transmitted from reference server 1100 is not limited to that shown in FIG. 12. For instance, the orbit information may include almanac in addition to the ephemeris data.

Figure 13:
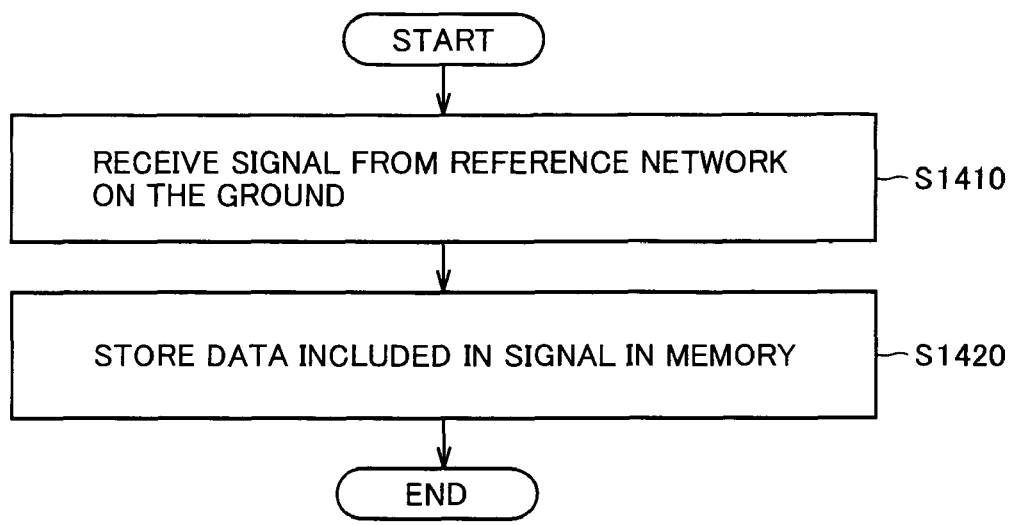
FIG. 13 is a flow chart (I) representing process steps executed by transmitting apparatus 1000 in accordance with the second embodiment of the present invention.

Referring to FIG. 13, a control structure of transmitting apparatus 1000 in accordance with the present embodiment will be described. FIG. 13 is a flow chart representing a process in which transmitting apparatus 1000 receives the data for correction from reference server 1100. The process is executed independently from the process for transmitting a positioning signal.

In step S1410, transmitting apparatus 1000 receives a signal transmitted from reference server 1100 through antenna 1010. Reference server 1100 is installed, for example, on a control station on the ground. In step S1420, transmitting apparatus 1000 obtains, through obtaining portion 1030, data included in the received signal, and stores in a prescribed area of memory 1040. At this time, the time of reception is stored in association with each data. In this manner, transmitting apparatus 1000 can obtain data for correcting data used for positioning.

Figure 14:
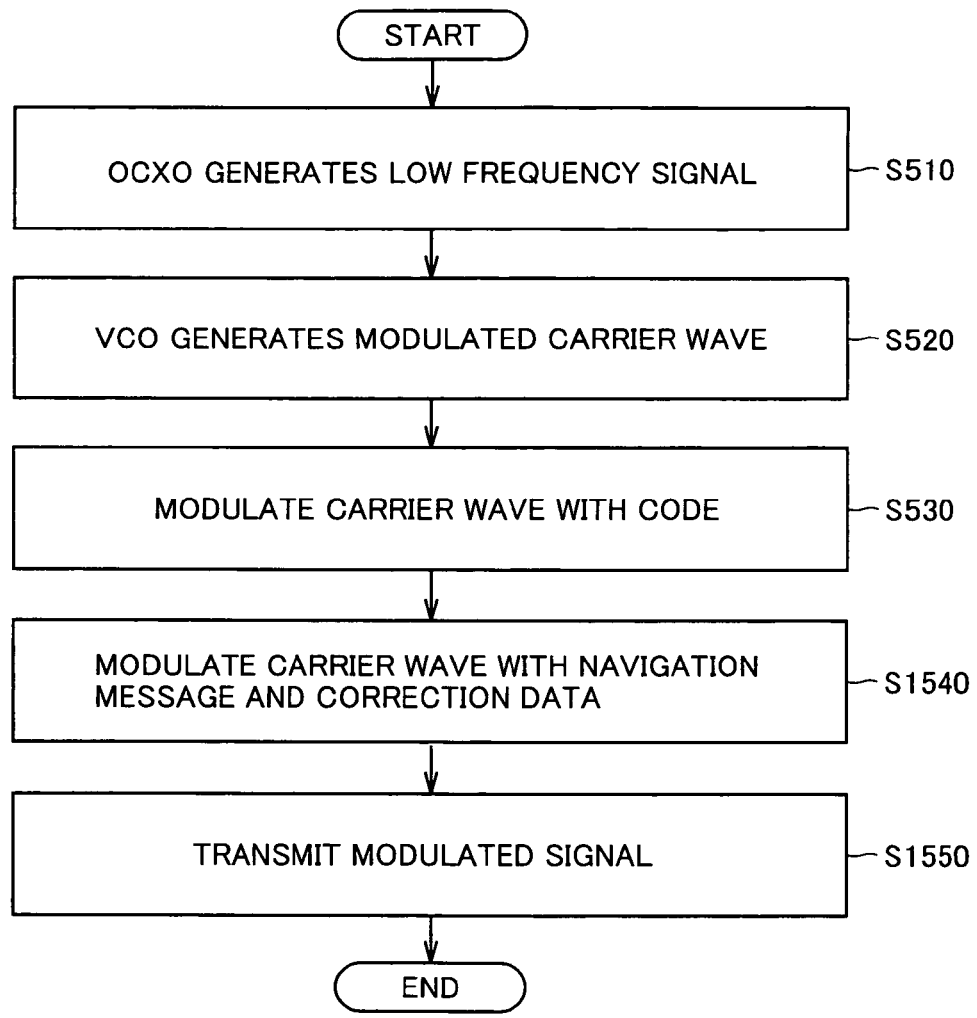
FIG. 14 is a flow chart (II) representing process steps executed by transmitting apparatus 1000 in accordance with the second embodiment of the present invention.

Referring to FIG. 14, the control structure of transmitting apparatus 1000 in accordance with the present embodiment will further be described. FIG. 14 is a flow chart representing process steps executed by transmitting apparatus 1000 to transmit a positioning signal. The same steps as those described above are denoted by the same step numbers. Therefore, description thereof will not be repeated.

In step S1540, multiplier 1060 of transmitting apparatus 1000 modulates the signal from multiplier 240 based on the data for correction stored in memory 1040 and on the navigation message stored in memory 250, and outputs the result to transmitting portion 280. In step S1550, the modulated signal is transmitted to the outer space through antenna 290 as in the process described above. The signal thus provided includes data for correction in addition to the positioning signal. Therefore, the receiver receiving the signal can correct the measurement using the data, as will be described in the following, and therefore, the error in the measurement can be reduced. As a result, the calculated positional information comes to have higher accuracy.

Figure 15:
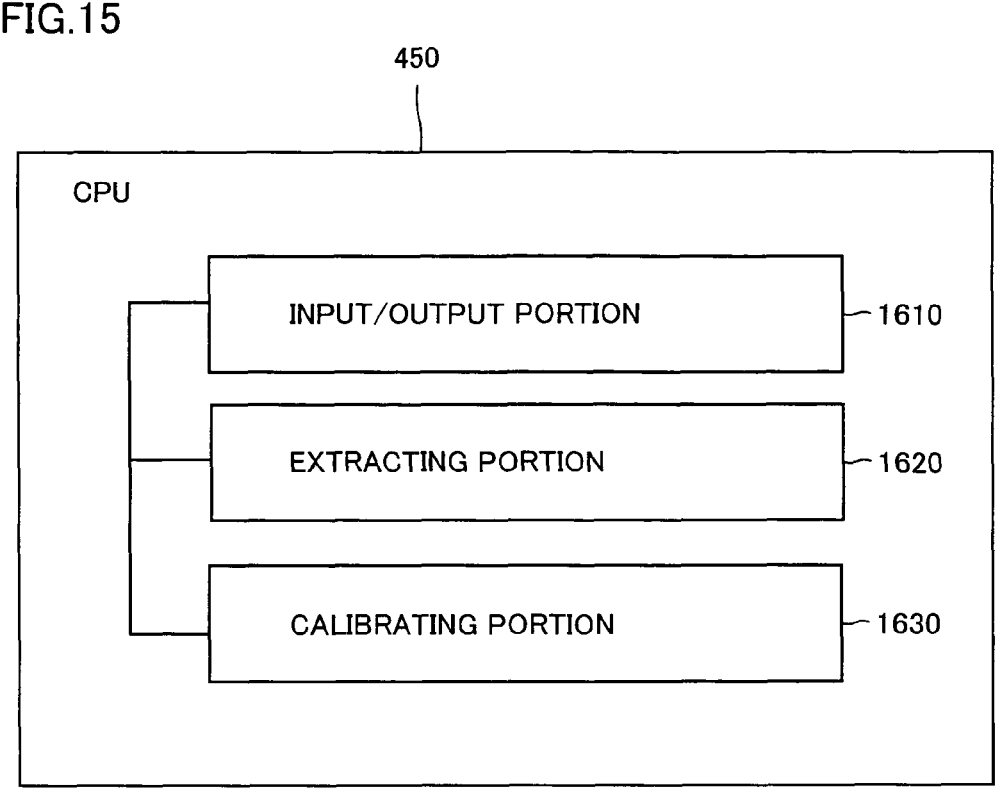
FIG. 15 is a block diagram representing a functional configuration of CPU 450 provided in a GPS receiver capable of receiving a signal transmitted from transmitting apparatus 1000.

Referring to FIG. 15, a structure of a GPS receiver receiving the signal transmitted from transmitting apparatus 1000 in accordance with the present embodiment will be described. FIG. 15 is a block diagram representing a functional structure of a CPU 450 provided in the GPS receiver. These functions are realized when a program stored in memory 460, for example, is executed. Such a GPS receiver is implemented, for example, by introducing a CPU 450 to the configuration shown in FIG. 6.

CPU 450 includes an input/output portion 1610 for inputting/outputting data, an extracting portion 1620 obtaining data for correction from the input data, and a calibrating portion 1630 for calibrating positional information based on the extracted data.

The signal output from parallel correlator circuit 430 (FIG. 6) is input to CPU 450 through input/output portion 1610. The input data includes data for correction, used for the operation of positioning GPS receiver 400. Extracting portion 1620 takes out the data for correction from the input data. Calibrating portion 1630 corrects the code obtained in accordance with the first embodiment, using the data for correction. Using the corrected code, CPU 450 calculates the positional information of GPS receiver 400. In this manner, GPS receiver 400 can obtain positional information with reduced errors.

Figure 16:
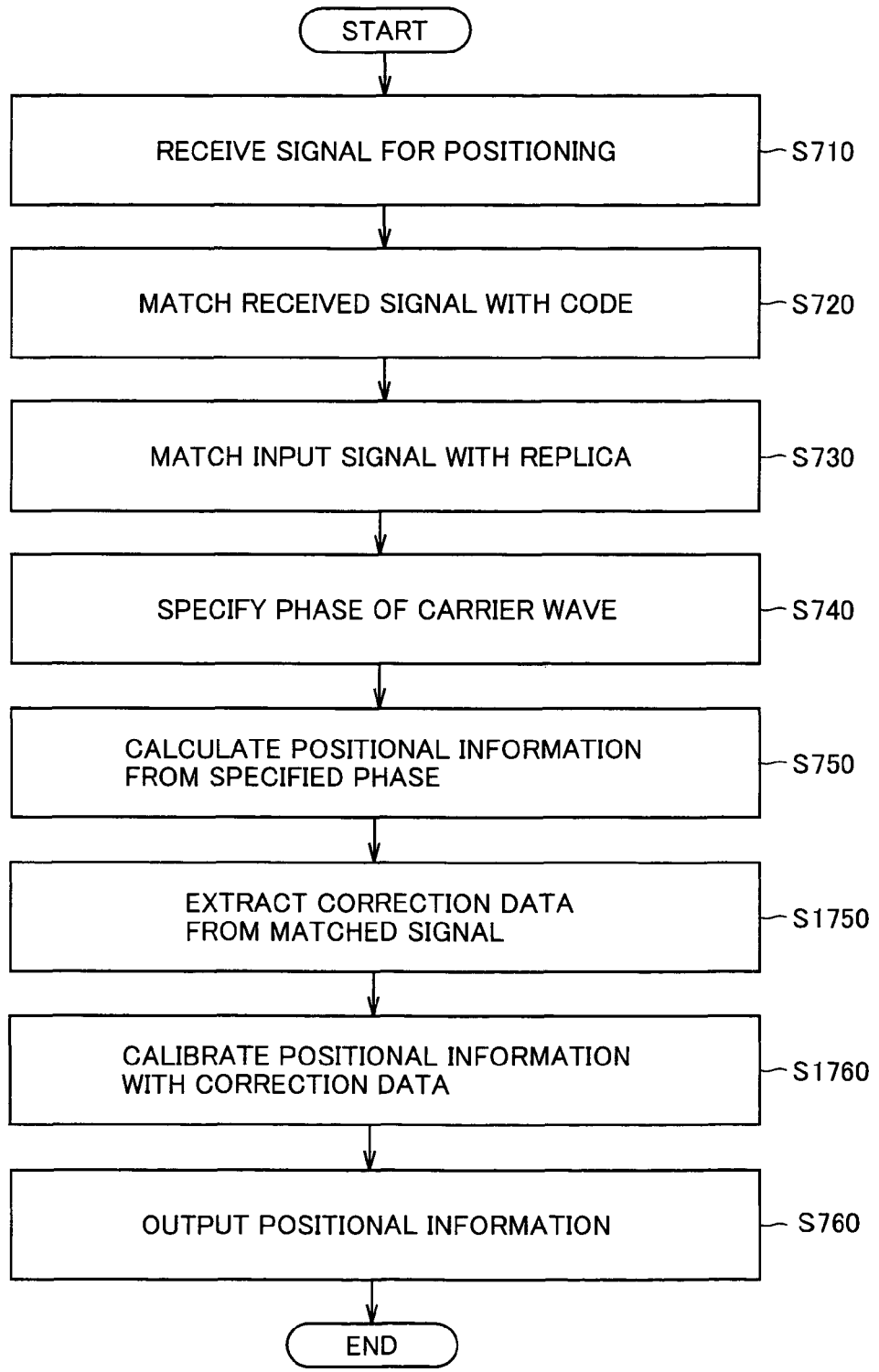
FIG. 16 is a flow chart representing process steps executed by CPU 450 provided in the GPS receiver.

Referring to FIG. 16, the control structure of GPS receiver 400 in accordance with the present embodiment will be described. FIG. 16 is a flow chart representing process steps executed by CPU 450. It is noted that the same steps as those shown in FIG. 7 are denoted by the same step numbers. Therefore, description thereof will not be repeated.

In step S1750, CPU 450 extracts, based on the signal from parallel correlator circuit 430, the data for correction included in the signal. In step S1760, CPU 450 calculates corrected positional data, based on the extracted data and the positional data obtained by parallel correlator circuit 430. In step S760, CPU 450 outputs position data to display 470.

As described above, in transmitting apparatus 1000, the data for correction obtained from the control station or from other external source is stored beforehand. Transmitting apparatus 1000 transmits the data together with the navigation message, C/A code and the like. GPS receiver 400 receiving such a signal uses the data for correction in calculating the positional information. The calculated positional information has the error related to the data removed. Therefore, positional information can be calculated with the error derived from relative velocity between GPS receiver 400 and the artificial satellite removed. Thus, a transmitting apparatus that can transmit a highly accurate signal for positioning can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for transmitting a positioning signal, comprising:
   a data store configured to store data to be encoded;
   a code generator configured to generate a code pattern based on a code for identifying a transmission source of the positioning signal;
   a signal generator configured to generate a periodic signal;
   a first signal multiplier configured to modulate a carrier wave with the code pattern generated by the code generator;
   an oscillator configured to generate the carrier wave, wherein the carrier wave is frequency modulated based on the periodic signal, the frequency of the modulated carrier wave changing between set frequencies;
   a second signal multiplier configured to modulate the stored data with the multiplied carrier wave to output the positioning signal; and
   a transmitter configured to transmit the outputted positioning signal.

2. The apparatus for transmitting a positioning signal according to claim 1, wherein the waveform of the positioning signal is rectangular and the generator generates a signal having a sawtooth waveform.

3. The apparatus for transmitting a positioning signal according to claim 1, wherein said apparatus is mounted on an artificial satellite.

4. The apparatus for transmitting a positioning signal according to claim 3, wherein the data to be encoded includes orbit information of the artificial satellite.

5. The apparatus for transmitting a positioning signal according to claim 4, further comprising:
   a receiver configured to receive the orbit information; and
   a writer configured to write the orbit information received by the receiver in the data store.

6. The apparatus for transmitting a positioning signal according to claim 1, further comprising:
   a time keeper configured to keep time;
   wherein the positioning signal includes the time.

7. The apparatus for transmitting a positioning signal according to claim 1, wherein the signal generator includes a second oscillator.

8. A positioning system, comprising:
   the apparatus for transmitting a positioning signal according to claim 1; and
   a receiving device configured to execute a positioning operation based on the positioning signal transmitted from the apparatus; wherein the receiving device comprises:
      a receiver configured to receive each of the positioning signals transmitted from each of a plurality of the transmitting apparatuses,
      an identifier configured to identify a transmission source of each of the positioning signals,
      a second oscillator configured to generate the same signal as each of the signals modulated by each of the positioning signals,
      an obtainer configured to obtain the positioning signal based on the signal received by the receiver and on the signal generated by the oscillator, for each of the identified transmission sources,
      a calculator configured to calculate positional information of the receiving device based on the positioning signal, and
      an outputter configured to output the positional information.

9. The positioning system according to claim 8, wherein the second oscillator includes a generator configured to generate a periodic signal.

10. The positioning system according to claim 9, wherein a period of the periodic signal is below a length of a signal corresponding to two bits in the code.

11. A system for transmitting a positioning signal, comprising:
    a plurality of transmitting apparatuses transmitting a positioning signal,
       wherein each of said plurality of transmitting apparatuses comprises:
          a data store configured to store data to be encoded,
          a time keeper configured to keep time, and
          a receiver configured to receive correction information for correcting information included in the positioning signal, and
       wherein the correcting information comprises:
          position correction data for correcting information representing position of the transmitting apparatus,
          time correction data for correcting time, and
          characteristic correction data for correcting information representing characteristic of a region in which the positioning signal propagates;
    a writer configured to write the correction information received by the receiver in the data store;
    a code generator configured to generate a code pattern based on a code for identifying a transmission source of the positioning signal;
    a signal generator configured to generate a periodic signal;
    a first signal multiplier configured to modulate a carrier wave with the code pattern generated by the code generator;
    an oscillator configured to generate the carrier wave, wherein the carrier wave is frequency modulated based on the periodic signal, the frequency of the modulated carrier wave changing between set frequencies;

a second signal multiplier configured to modulate the stored data with the multiplied carrier wave to output the positioning signal; and a transmitter configured to transmit the outputted positioning signal.

12. The system for transmitting a positioning signal according to claim 11, wherein each of said plurality of transmitting apparatuses is mounted on each of a plurality of artificial satellites.

13. The system for transmitting a positioning signal according to claim 11, further comprising:

a correction information transmitting apparatus configured to transmit the correction information to each of the plurality of transmitting apparatuses, the correction information transmitting apparatus comprises:

an inputter configured to receive input of the correction information, a correction data store configured to store the correction information, and a control transmitter configured to transmit the correction information when a predetermined condition is satisfied.

14. The system for transmitting a positioning signal according to claim 13, wherein said correction information transmitting apparatus further comprises a detector configured to detect an update of the correction information; and the control transmitter transmits the correction information when an update of the correction information is detected.

15. The system for transmitting a positioning signal according to claim 13, wherein the correction information transmitting apparatus further comprises:

a time keeper configured to keep time; and the control transmitter transmits the correction information at a predetermined time.

16. The system for transmitting a positioning signal according to claim 13, wherein the control transmitter comprises:

a reader configured to read the correction information from the correction data store, a generator configured to generate data for transmission based on the read correction information, and a transmitter configured to transmit by radio wave the generated data.

17. The apparatus for transmitting a positioning signal of claim 1, wherein the positioning signal comprises position correction date for correcting information representing a position of the transmitting apparatus, time correction data for correcting time, and characteristic correction data for correcting information representing a characteristic of a region in which the positioning signal is propagated.

18. A method for transmitting a positioning signal, comprising:

generating a positioning signal by encoding data stored in a data store based on a code for identifying a transmission source of the positioning signal;

generating a periodic signal;

generating a carrier wave by an oscillator;

frequency modulating the carrier wave by the periodic signal, the frequency of the modulated carrier wave changing between set frequencies;

multiplying the carrier wave with the code for identifying a transmission source of the positioning signal to obtain a multiplied carrier wave;

multiplying the encoded data with the multiplied carrier wave to output the positioning signal; and transmitting the outputted positioning signal based on the modulated carrier wave.

19. The method for transmitting a positioning signal of claim 18, wherein the positioning signal comprises position correction data for correcting information representing a position of the transmitting apparatus, time correction data for correcting time, and characteristic correction data for correcting information representing a characteristic of a region in which the positioning signal is propagated.

* * * * *